(12) United States Patent
Kim

(10) Patent No.: US 6,269,158 B1
(45) Date of Patent: Jul. 31, 2001

(54) METHOD AND COMBINATION FOR PROVIDING TELEPHONE CALLING AND POSTAL COMMUNICATIONS

(75) Inventor: Hyun D. Kim, 8 Fox Hollow Rd., Montville, NJ (US) 07045

(73) Assignee: Hyun D. Kim, Montville, NJ (US)

( * ) Notice: Subject to any disclaimer, the term of this patent is extended or adjusted under 35 U.S.C. 154(b) by 0 days.

(21) Appl. No.: 09/149,926

(22) Filed: Sep. 9, 1998

(51) Int. Cl.⁷ .............................. H04M 1/24; H42D 15/00
(52) U.S. Cl. ...................... 379/144.01; 229/92.8
(58) Field of Search .................... 379/114, 143, 379/144; 705/408, 28, 29, 401; 283/2, 5, 61, 62, 107, 108, 109, 110; 229/92, 92.1, 92.8, 300, 70

(56) References Cited

U.S. PATENT DOCUMENTS

| | | | |
|---|---|---|---|
| 4,838,580 | * 6/1989 | Tuhkanen | 283/56 |
| 5,513,117 | * 4/1996 | Small | 364/479 |
| 5,609,253 | * 3/1997 | Goade, Sr. | 206/460 |
| 5,629,977 | 5/1997 | Fonseca | 379/144 |
| 5,640,447 | * 6/1997 | Fonseca | 379/144 |
| 5,652,606 | 7/1997 | Sasaki | 345/204 |
| 5,921,584 | * 7/1999 | Goade, Sr. | 283/107 |
| 5,923,734 | * 7/1999 | Taskett | 379/88.25 |
| 5,992,731 | * 11/1999 | Tani | 229/92.8 |

* cited by examiner

Primary Examiner—Binh K. Tieu
(74) Attorney, Agent, or Firm—Rashida A. Karmali

(57) ABSTRACT

A card unit system comprising a combination of a postal communication and a detachable telephone calling card and a method for constructing and implementing such unit system which combines the benefits of telecommunication with postage and which optionally includes a gift certificate, coupon or a toll free number to access appropriate voice mail on a single unit.

2 Claims, 10 Drawing Sheets

METHOD AND COMBINATION FOR PROVIDING TELEPHONE CALLING AND POSTAL COMMUNICATIONS

BACKGROUND OF THE INVENTION

The present invention relates in general to the telecommunication and postal industries, and in particular to a combination of telephone call cards, postcards, special events cards, coupons, gift certificates or aerograms, to provide prepaid and/or postpaid communication means.

Telecommunication, a form of audio message transfer, is by for the most popular form of communication because of its convenience and speed. A telephone call provides the benefit of speaking to each other for parties and persons who are geographically separated.

Postal communication, a form of visual message transfer, provides a means of communicating in writing between people and for exchanging written documents and materials. Telecommunication is replacing postal communications for providing the benefit of interactive conversation as well as making it possible for exchange of written information rapidly by fax. However, in many parts of the world, access to means of telecommunication is not easy, practical or affordable.

The prior art includes examples of items which combine a telephone calling card with a greeting card (U.S. Pat. No. 5,629,977, issued to Fonseca, F. on May 3, 1997) or a card including an electronic device containing a recorded message (U.S. Pat. No. 5,652,606, issued to Sasaki, N. et al. on Jul. 29, 1997). Fonseca discloses a method and assembly for allowing telephone calling credit to be provided in conjunction with a greeting card. The greeting card comprises a greeting card, an envelope having an inside pocket adapted to receive the greeting card and a calling card access identifier designating a account against which telephones can be charged. Thus, Fonseca discloses an invention which comprises several separate items and which is suitable for greeting cards (most probably for special occasions such as birthdays, anniversaries, or weddings) which must first be placed into the envelope. The envelope further needs to be sealed after adding the calling card and finally to be stamped. The main disadvantages of this assembly and method are: 1) the inconvenience of having to buy and/or deal with several items separately rather than have everything in a single unit, and 2) the cost of the individually purchased greeting card/calling card,envelope and stamp.

Sasaki et al. discloses a message card which includes a button type dry battery, a visual image display, a speaker, a control circuit for recording, storing and reproducing both of visual images and audio messages data, and a flexible circuit substrate for the control circuit. The electronic device used in this invention is complex, expensive, heavy and requires an outside energy source such as batteries to run it. Thus, the invention disclosed by Sasaki et al. is unsuitable for providing a convenient, easy and cheap system and method for combining the audio and visual message transfers in one unit. It is therefore important to provide a method and combination of a postal communication, providing postal communication and a telephone calling card, providing the benefits of telecommunication in a unique single card product.

SUMMARY OF THE INVENTION

It is therefore an object of the present invention to provide a postal communication and telephone calling card unit system and a method for constructing and implementing such a unit system which combines the benefits of telecommunication by including a predetermined, calling charge credit with postal communication by including a pre-stamped and/or bulk rate post-paid postcard which is separated form the calling card by a perforated edge.

It is another object of the present invention to provide a unit system and method for combining a postcard and a telephone card which unit itself may be mailed without an envelope and includes a bulk rate postage stamp so that the user does not have to purchase separate stamps.

It is yet another object of the present invention to include a toll free number on a designated region of the unit which can access a database to pick up a voice mail message.

It is also an object of the present invention to further include in the unit system a gift certificate or coupons and an appropriate toll free number. The sender may thus send by mail gift certificates, coupons, or advertisement notices which are inscribed on the unit system. The receiver may call the toll free number, enter the receiver's account number and activate the coupon or certificate, or the user may mail back the signed communication to the sender or leave a synthetic voice mail or recorded musical message.

It is also an object of the present invention to construct a unit system that combines an aerogram and a calling card which is suitable for use world wide, provides privacy because the aerogram is folded and sealed, and which can be mailed on a cheap flat postal rate.

Another object of the present invention is to provide a combination of a telephone calling card and a postcard, the postcard portion containing an exposed visual display such as a photograph or picture.

Another object of the invention is to provide a foldable card unit system having the detachable calling card portion fold over the message portion, thereby allowing the entire and/or partial unit to be mailed confidentially.

Yet another object of the invention is to provide a card unit system comprising a gift certificate or coupons, a toll free number and/or an additional postage stamp covered by a removable label.

It is also the object of the invention to provide an aerogram comprising a visual image, a detachable calling card and commercial advertising space, thereby renewing the use of aerogram use worldwide.

Another object of the present invention is to provide such a card unit system and method for constructing which allows the unit to be sold through the post office, retail and wholesale markets, holiday resorts and commercial outlets, public and private vendors, and which minimizes the opportunity for misappropriation of the calling credit, the gift certificate or the coupons.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

In the accompanying drawings which form part of the specification, some of the embodiments of the present invention are described as follows.

DETAILED DESCRIPTION OF THE INVENTION

Figure 1:
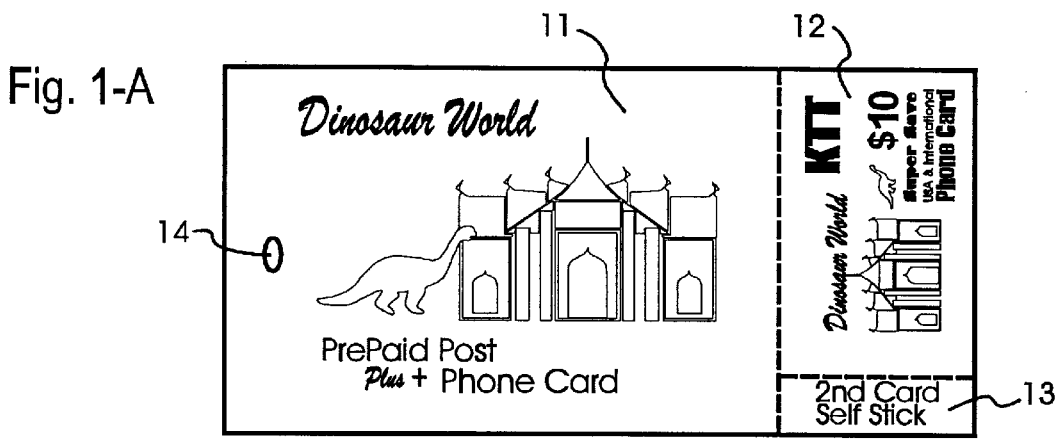
FIG. 1 is a frontal view of a card unit system showing a detachable calling card attachment.
Figure 1:
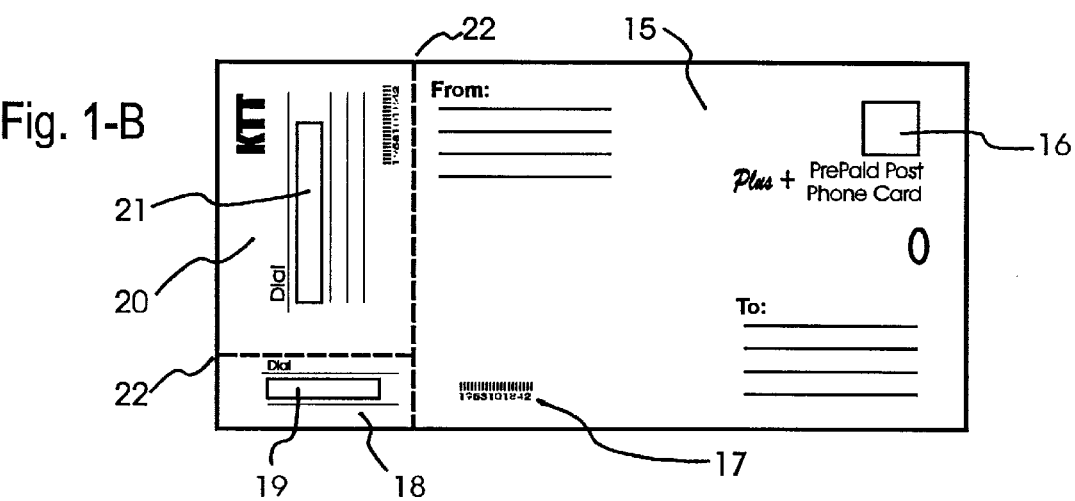
Figure 1:
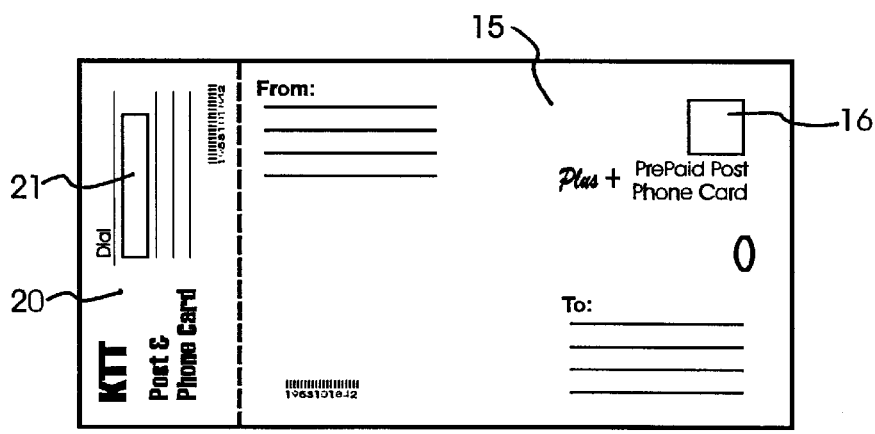

Referring to FIG. 1A, the card unit system 11 of the present invention comprises a postcard 11, a telephone calling card 12, a detachable label 13 and a section 14 on one side of the postcard 11, for hanging the frontal view of the postcard 11.

The telephone calling card 12 is detachable from the postcard portion 11 at a perforated edge 22 (FIG. 1B). The frontal view of the postcard 11 has dimensions well-known in the art and may include materials including, but not limited to, images, scenic photographs or advertising information.

The calling card portion 12 has dimensions well-known in the art, and may also include images, scenic photographs, advertising information, the amount of present credit, the access calling card information, and a toll free number covered temporarily with an adhesive backing on the detachable label 13.

FIG. 1B describes the back view, which comprises space 15 for writing on the postcard, a bulk rate postage stamp 16, a service code 17 with bar code printing used for tracking, a small detachable portion 18 containing a toll free number, an account number and/or a pin number and which is usually covered with an adhesive backing. The account or pin number 19 is concealed by a scratch-off material or label. The backside of the calling card 20, may contain a toll free number, an account number, a customer service number or a telephone company logo. The detachable portion 13 is attached to the rest of the calling card by a perforated edge 22. The calling card 12 itself may have a pin or account number 21 which is also concealed by a scratch-off material or label.

FIG. 1C describes an embodiment that is similar to FIG. 1A and FIG. 1B but consists of a single calling card 12 without the smaller second detachable portion 13.

Figure 2:
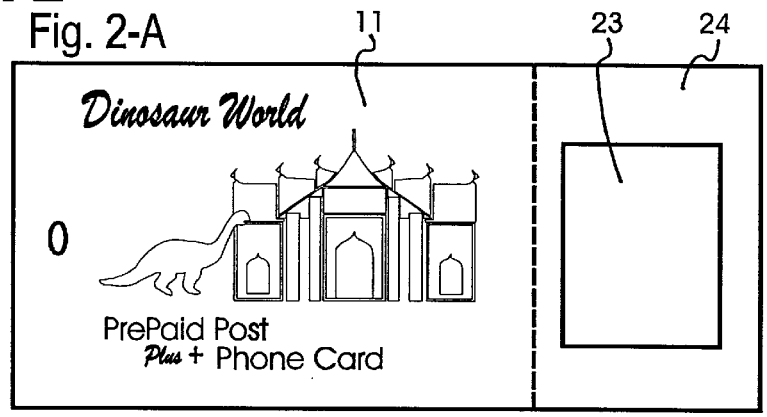
FIG. 2 is a frontal and side view of a card unit system showing two sheets pressed together and comprising a detachable calling card in-between the two sheets.
Figure 2:
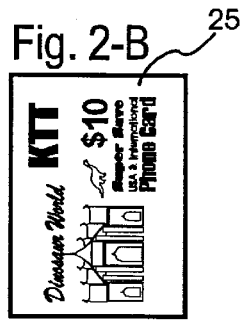
Figure 2:
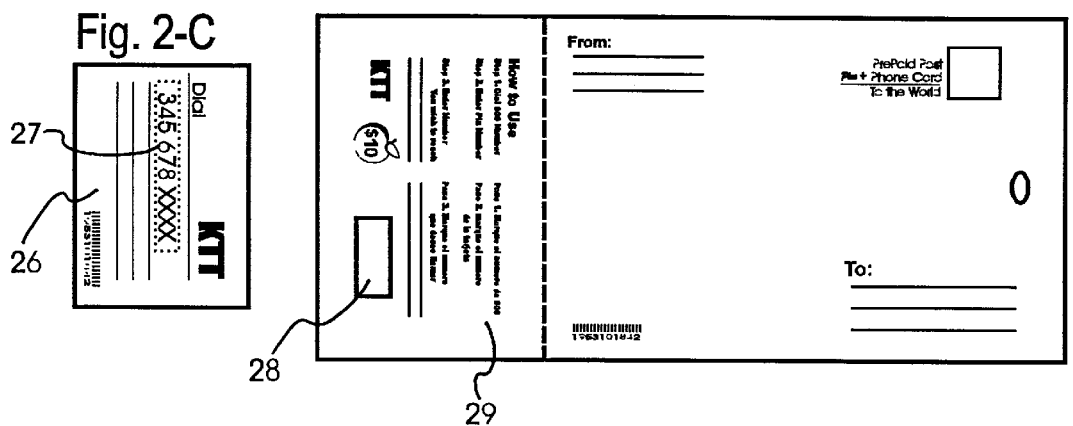
Figure 2:
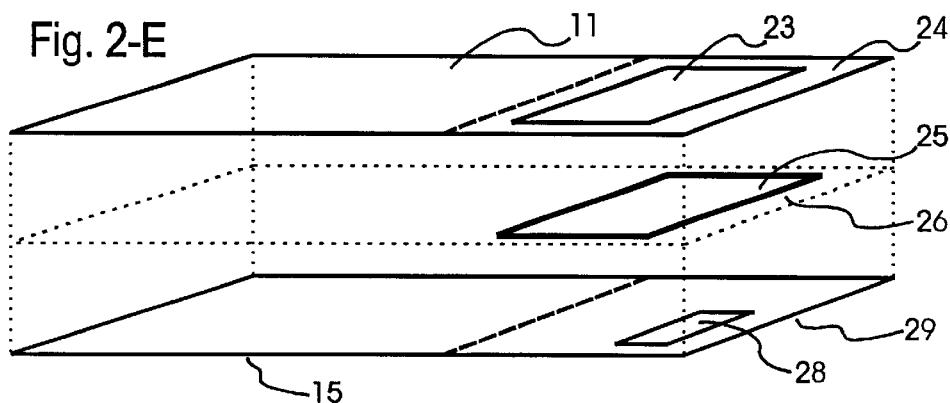
Figure 2:
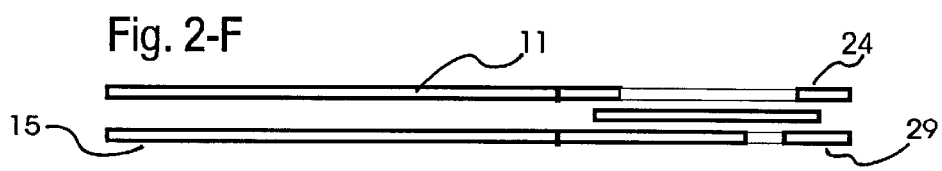

FIG. 2A describes an embodiment of the frontal view of the card unit system comprising an open window slip 23 through which the calling card 25 (described in FIG. 2B) may be removed, and a body frame 24 surrounding the open window 23.

FIG. 2C describes an embodiment of the back view of a calling card comprising a toll free number, account or pin number and/or a customer service number 26, and an account or pin number 27.

FIG. 2D describes an open window 28, the back view of the body frame 24 for the open window 23, and portion 29 including detailed instructions on how to use the card and the dollar amount of credit. FIGS. 2E and 2F are three dimensional constructions for the embodiments described in FIGS. 2A–D.

Figure 3:
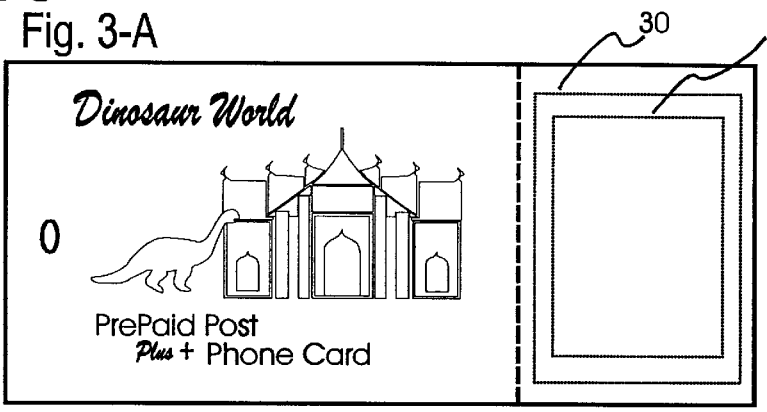
FIG. 3 is a frontal and side view of a card unit system showing a detachable calling card attachment enclosed in a plastic packaging.
Figure 3:
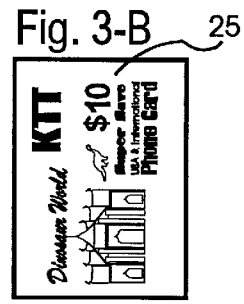
Figure 3:
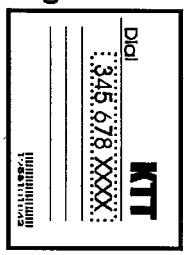
Figure 3:
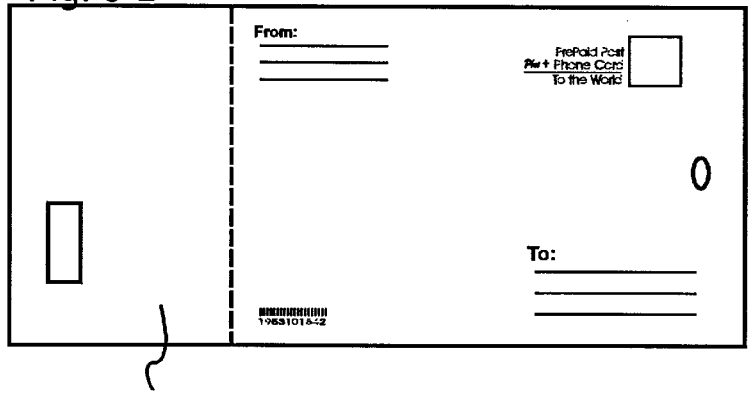
Figure 3:
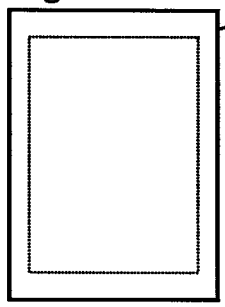
Figure 3:
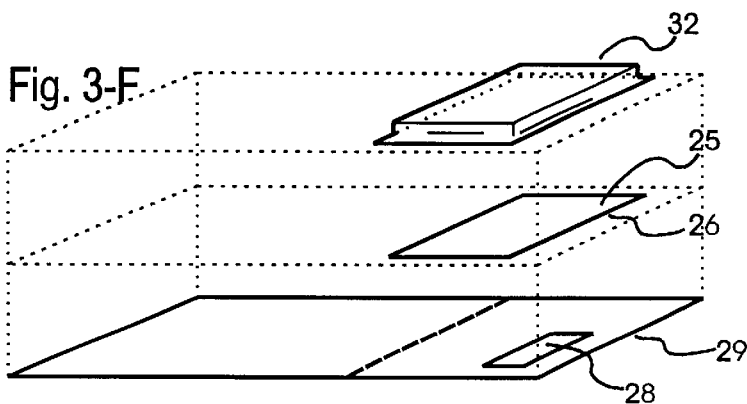
Figure 3:

FIG. 3A describes yet another embodiment of the card unit system, comprising a blister platform package 30, a calling card 31, and a plastic blister package molding 32 glued onto platform 30. FIGS. 3B–3G represent different views and dimensional construction instructions for the embodiment.

Figure 4:
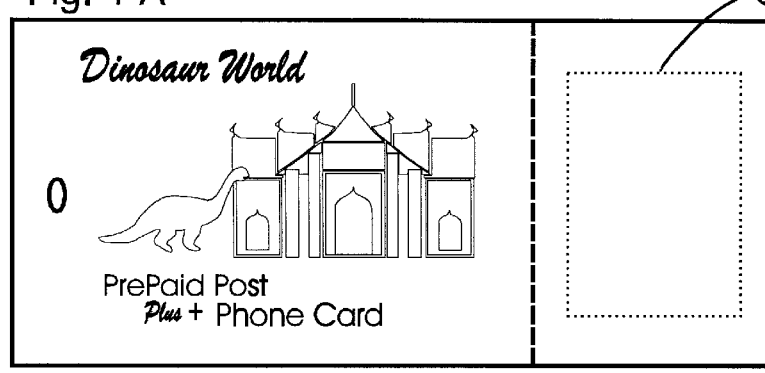
FIG. 4 is a frontal and side view of a card unit system showing a one side of detachable calling card placed on top of a postcard and having a layer of vinyl lamination on top of it.
Figure 4:
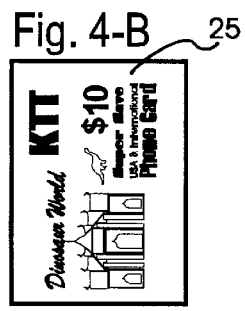
Figure 4:
Figure 4:
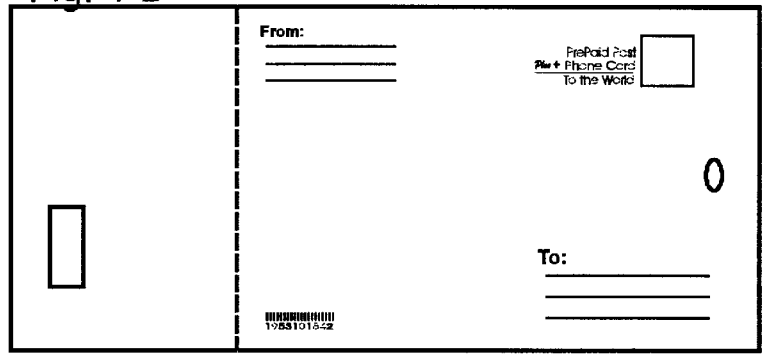
Figure 4:
Figure 4:
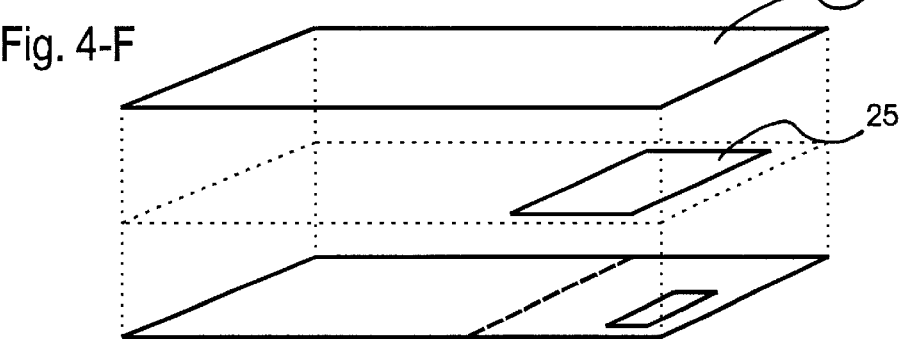
Figure 4:

FIG. 4A describes a frontal view of an embodiment of the card unit system comprising a clear vinyl film lamination 33 covering the card unit.

Figure 5:
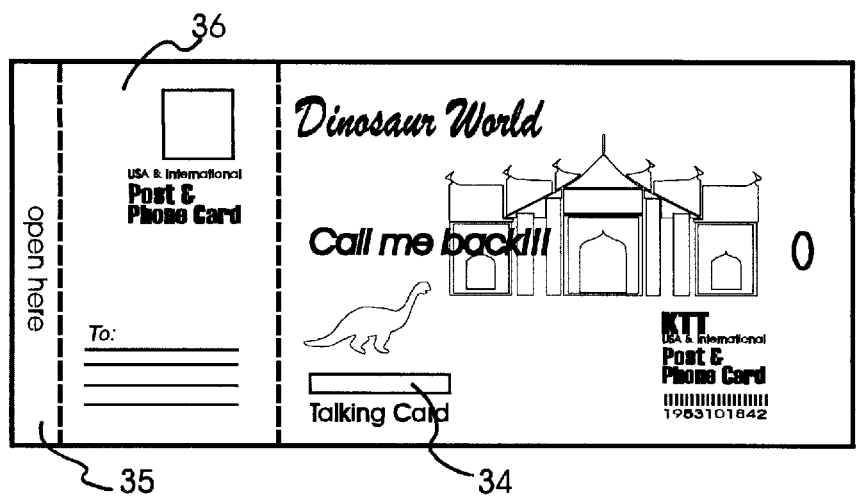
FIG. 5 is a frontal view of a card unit system constructed to fold the detachable calling card over the message, thereby allowing the entire and/or partial unit to be mailed confidentially.
Figure 5:
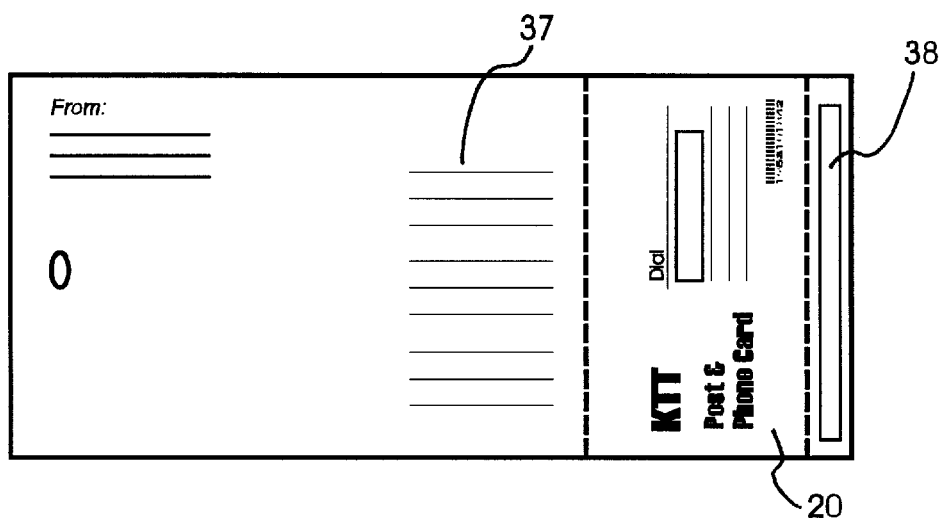
Figure 5:
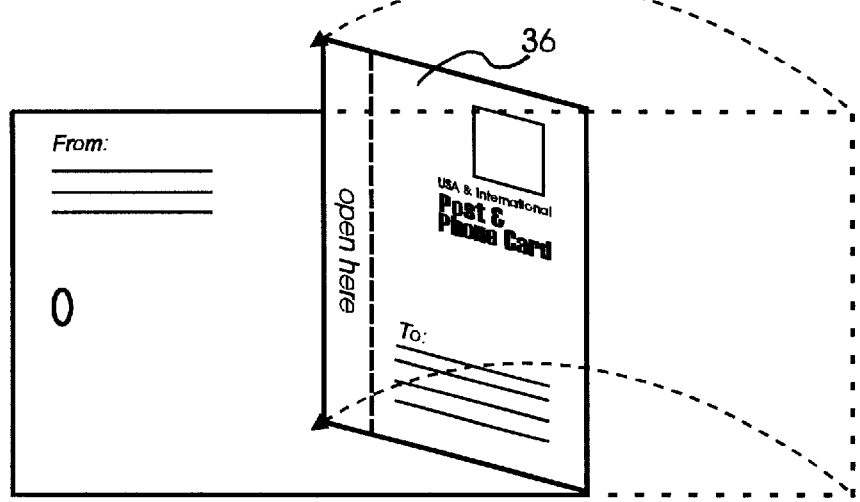

FIG. 5A describes an embodiment of the card unit system which includes on the frontal view a portion 34 providing information on account number or voice mail identification number (corresponding to portions 19 and 21 shown in FIG. 1B). The embodiment described in FIG. 5A comprises a folded tab 35 which contains printed instructions on use of a calling card, a gift certificate or a coupon; a detachable calling card 36 containing a postage stamp portion and lines for writing an address. Thus, when folded, card 36 covers an area denoted 37 where a confidential information or message may be inscribed. An adhesive preset glue 38 is used to seal the folded unit.

Figure 6:
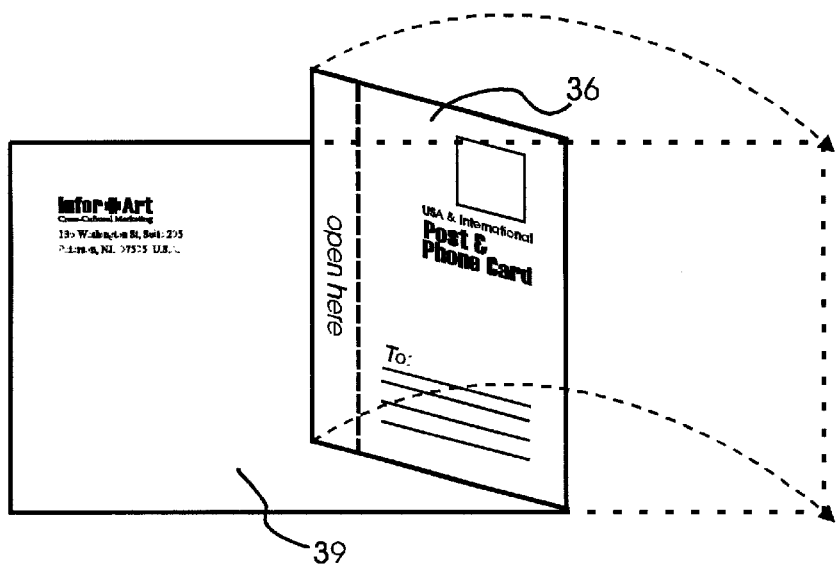
FIG. 6 is a frontal view of a card unit system further comprising a gift certificate or a coupon and a toll free number, constructed to fold the detachable calling card over the message, so that the entire unit may be mailed confidentially.
Figure 6:
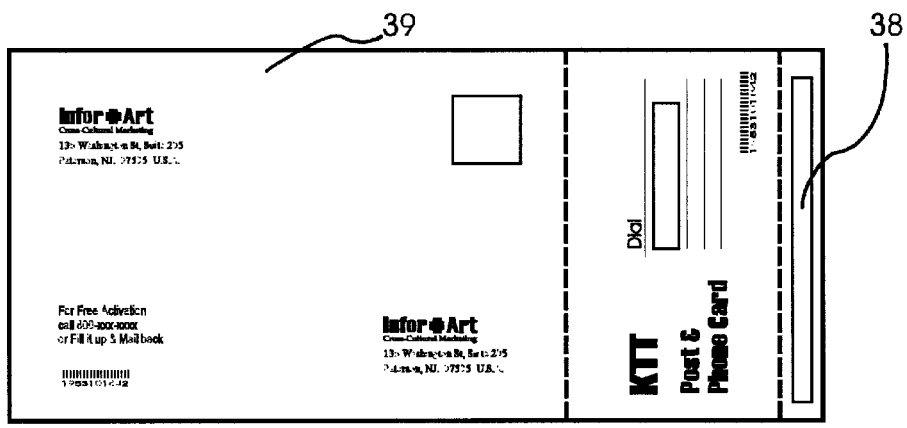
Figure 6:
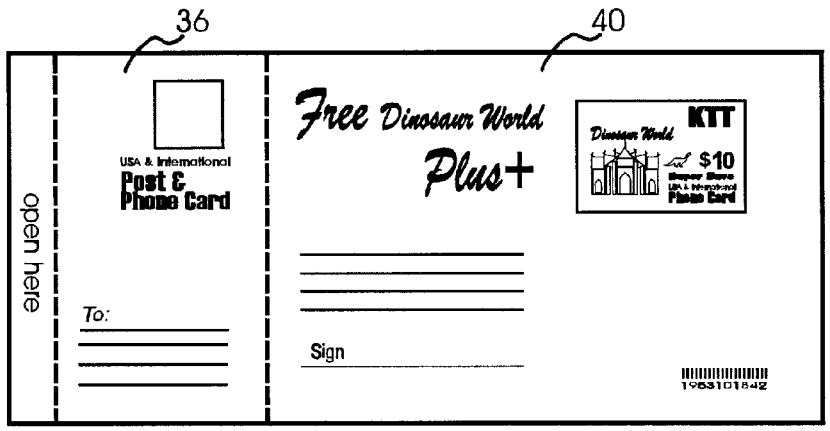

FIG. 6A describes yet another embodiment of the invention comprising portion 39 (described in FIG. 6B) containing the sender's address for purposes of returning the unit and/or instructions for activating or validating a gift certificate or coupon. A portion 40 on the back view (described in FIG. 6C) contains gift certificate information, a line for recipient's signature to confirm receipt of the unit and/or a tracking number.

Figure 7:
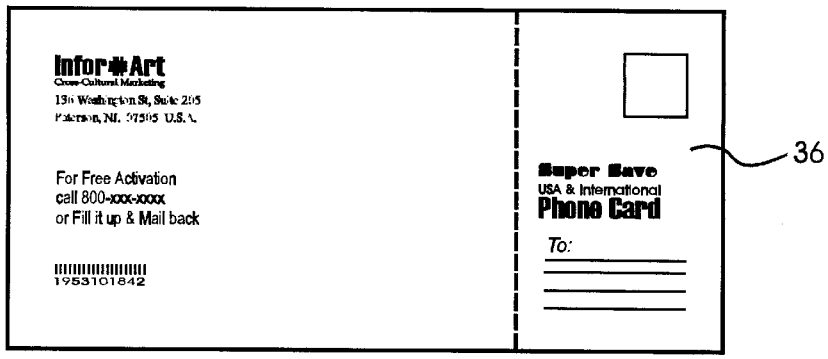
FIG. 7 is a frontal view of a card unit system comprising a gift certificate or a coupon and a toll free number, and further comprising a removable label covering the return mail postage stamp.
Figure 7:
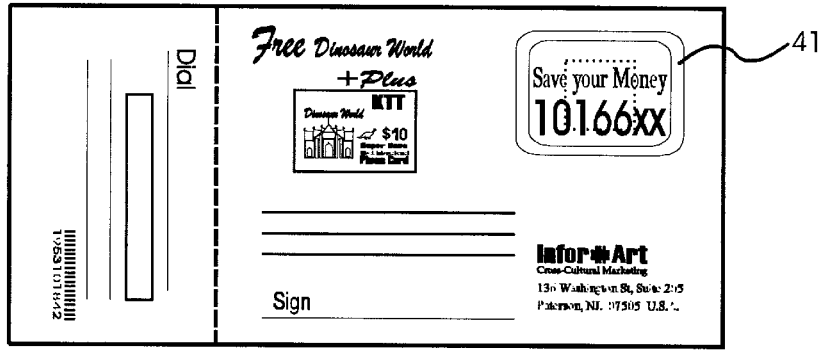
Figure 7:
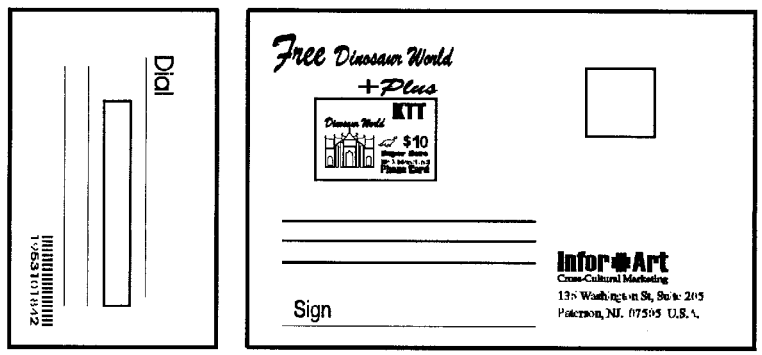

FIG. 7 describes yet another embodiment of the invention comprising an adhesive label or sticker 41 on the back view of the card unit (FIG. 7B) which covers the postage stamp portion and is removed at the time of returning the card unit. The adhesive label or sticker 41 may carry a company mark or an advertising logo.

Figure 8:
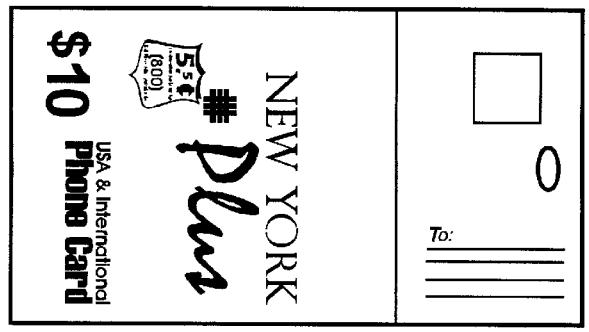
FIG. 8 is a frontal view of a card unit system having a cutting, and which can be folded over and held in position using a tab which fits into the cutting.
Figure 8:
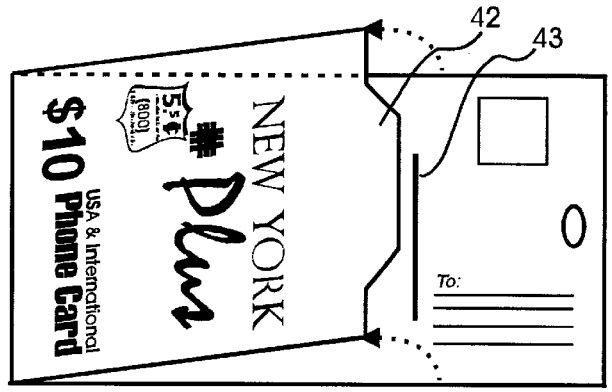
Figure 8:
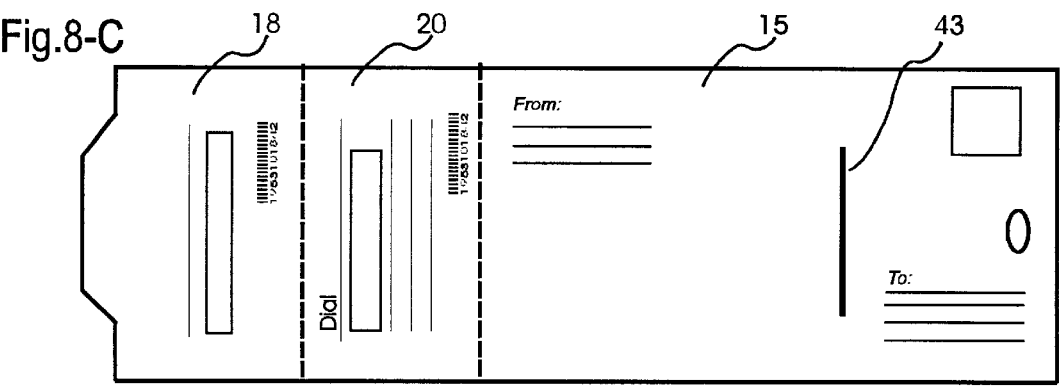
Figure 8:
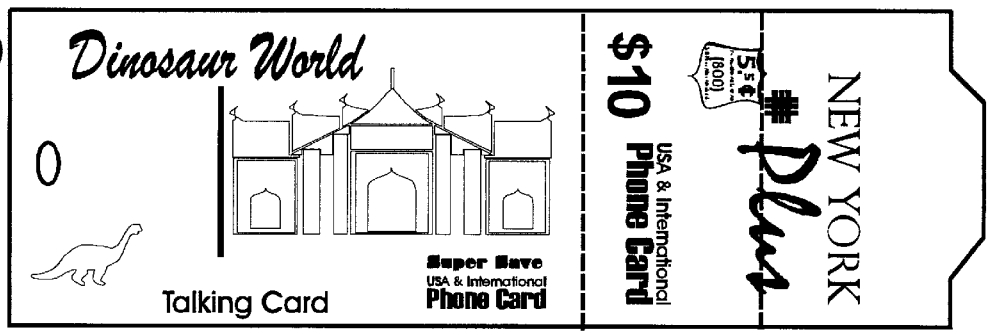

FIG. 8B describes an embodiment adapted to fold and be sealed by inserting a tab 42 into slit 43 extending adjacent to the portion having the address and postage sections, thereby rendering the embodiment sealed.

Figure 9:
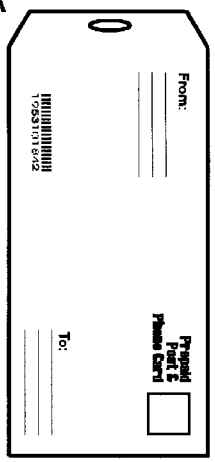
FIG. 9 is a frontal and back view of an aerogram comprising a visual image, a detachable calling card, calling card instructions and/or commercial advertising space.
Figure 9:
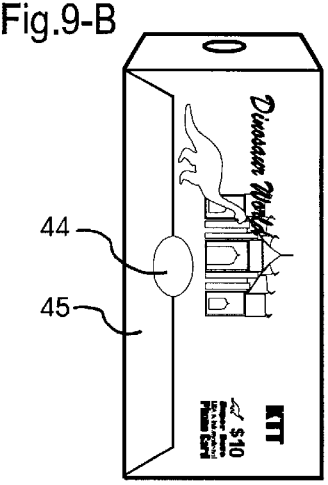
Figure 9:
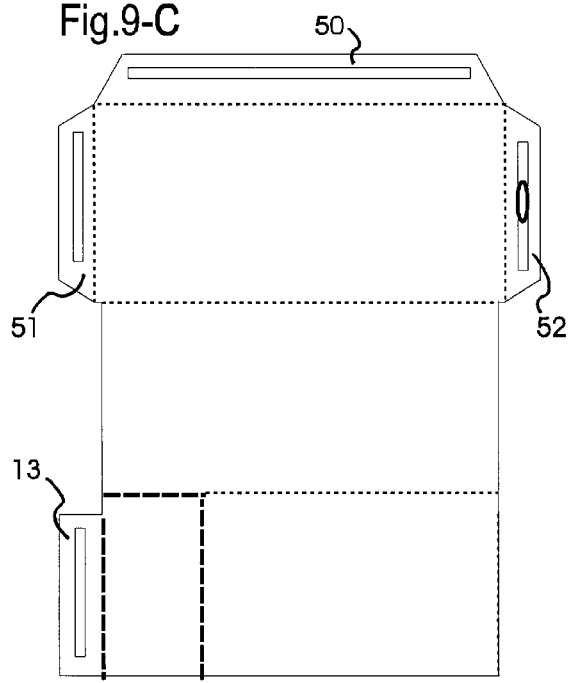
Figure 9:
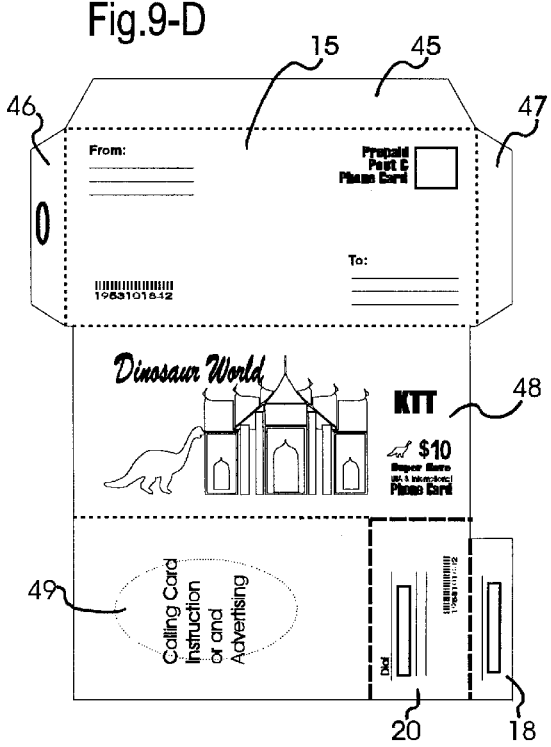
Figure 10:
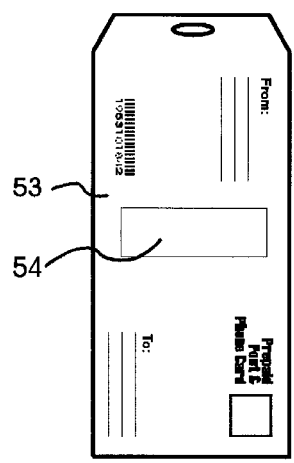
FIG. 10 is a frontal and back view of an aerogram comprising a visual image, a detachable calling card displayed through a window, calling card instructions and/or commercial advertising space.
Figure 10:
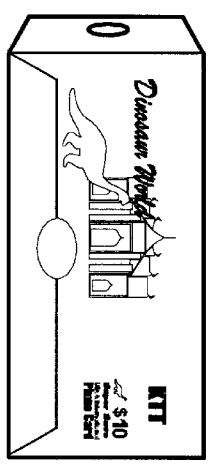
Figure 10:
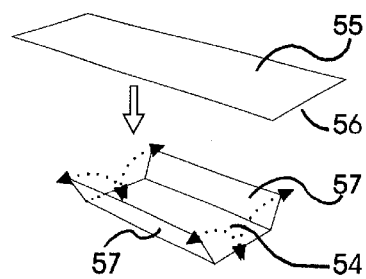
Figure 10:
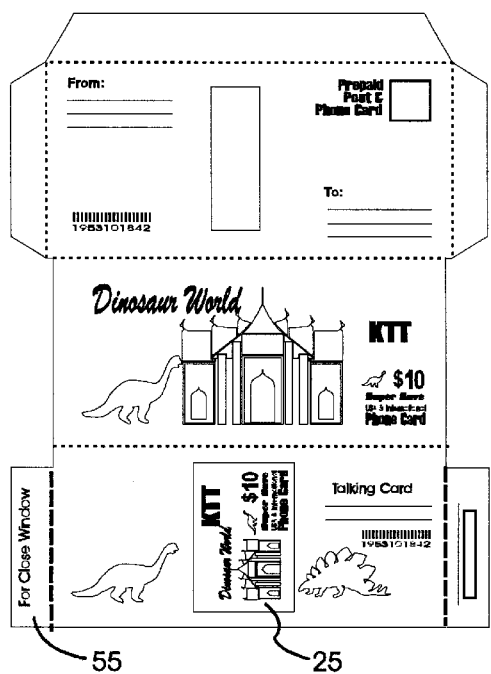
Figure 10:
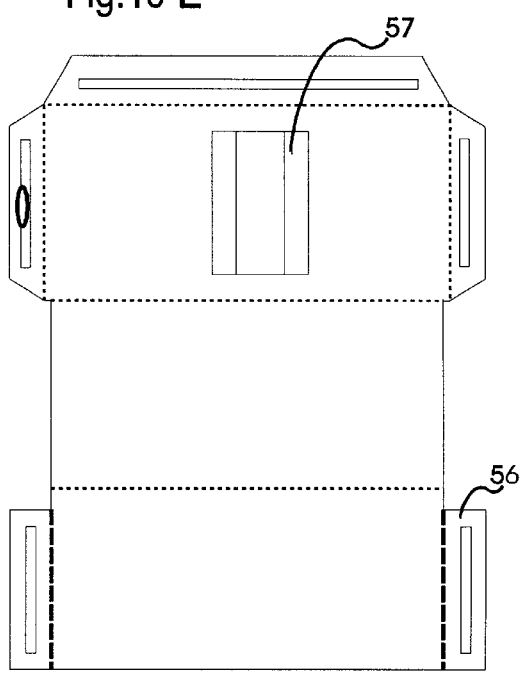

FIGS. 9 and 10 describe embodiments developed in the form of aerograms. Each embodiment comprises a top flap 45, two side flaps 46 and 47, a visual image 48 including a calling card and information about the company and preset credit amount, and instructions on calling card use or commercial advertising 49. Adhesive seals 50, 51 and 52 are included on the back view of the aerograms (FIG. 9C).

FIG. 10 describes in addition a clear window 54 for displaying the calling card, a detachable portion 55 (FIG. 10C) which is used to seal window 54; an adhesive preset glue portion 56 on the back view of the detachable flap 55 and paper flaps 57 which are folded over the window 54 to conceal the calling card in the aerogram.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, must be said to fall there between.

What is claimed is:

1. A card unit system comprising:

a postcard having a first end and a second end, said second end being marked by a perforated edge which is attached to a detachable calling card;

said post card comprising:

a first side displaying materials including images, photographs, gift certificates or coupons, and a second side displaying materials including a postage square, a section designating the address, a section designating the addressee and a toll free number for voice mail message retrieval; and, said post card further used as a gift certificate or coupon.

2. An aerogram system comprising a postcard portion, a calling card portion and adhesive flaps at the top and sides:

said postcard portion comprising:

a first side displaying materials including images, photographs, gift certificates or coupons, and a second side displaying materials including a postage square, a section designating the address, a section designating the addressee and a toll free number for voice mail message retrieval; and, said post card portion further used as a gift certificate or coupon.

\* \* \* \* \*